United States Patent
Janzen et al.

(10) Patent No.: US 9,801,512 B2
(45) Date of Patent: Oct. 31, 2017

(54) SELF-PROPELLED AND SELF-STEERING FLOOR CLEANING APPLIANCE

(71) Applicant: Alfred Kärcher GmbH & Co. KG, Winnenden (DE)

(72) Inventors: Jacob Janzen, Backnang-Waldrems (DE); Jochen Engele, Rudersberg (DE); Marc Meisenbacher, Fellbach (DE); Matthias Mack, Freiberg (DE)

(73) Assignee: ALfred Kärcher GmbH & Co. KG, Winnenden (DE)

( * ) Notice: Subject to any disclaimer, the term of this patent is extended or adjusted under 35 U.S.C. 154(b) by 0 days.

(21) Appl. No.: 14/947,329

(22) Filed: Nov. 20, 2015

(65) Prior Publication Data

US 2016/0073839 A1    Mar. 17, 2016

Related U.S. Application Data

(63) Continuation of application No. PCT/EP2013/060682, filed on May 23, 2013.

(51) Int. Cl.
- *A47L 9/00* (2006.01)
- *A47L 11/40* (2006.01)
- *G05D 1/02* (2006.01)

(52) U.S. Cl.
CPC .......... *A47L 9/009* (2013.01); *A47L 11/4061* (2013.01); *G05D 1/0227* (2013.01); *A47L 2201/04* (2013.01); *G05D 2201/0203* (2013.01)

(58) Field of Classification Search
CPC .......... A47L 9/009; A47L 9/11; A47L 9/4061; A47L 2201/04; G05D 1/0227; G05D 2201/0203
See application file for complete search history.

(56) References Cited

U.S. PATENT DOCUMENTS

| 3,952,361 A | 4/1976 | Wilkins |
| 5,012,886 A | 5/1991 | Jonas et al. |
| (Continued) | | |

FOREIGN PATENT DOCUMENTS

| WO | WO 02/071175 | 9/2002 |
| WO | WO 2013/006005 | 1/2013 |

OTHER PUBLICATIONS

International Application No. PCT/EP2013/060682, International Preliminary Report on Patentability, issued Dec. 3, 2015.

*Primary Examiner* — Dung Van Nguyen
(74) *Attorney, Agent, or Firm* — Womble Carlyle Sandridge & Rice LLP

(57) ABSTRACT

A self-propelled, self-steering floor cleaning appliance is provided with at least one cleaning element for cleaning a floor surface, including a drive device having an undercarriage, a sensing part for sensing obstacles, at least one displaceable holding part for holding the sensing part on the floor cleaning appliance and at least one detection element for detecting a displacement of the at least one holding part and for providing a signal relating thereto. The floor cleaning appliance includes at least one accommodating part on which the at least one holding part is held so as to be displaceable in a first and a second direction of displacement, which is aligned at an angle to the first direction of displacement, and the at least one detection element is actuatable by the at least one holding part upon displacement of the holding part in the first and in the second directions of displacement.

33 Claims, 8 Drawing Sheets

(56) References Cited

U.S. PATENT DOCUMENTS

| | | | |
|---|---|---|---|
| 7,441,298 B2* | 10/2008 | Svendsen | A47L 5/30 15/319 |
| 7,474,941 B2* | 1/2009 | Kim | A47L 9/009 15/319 |
| 7,992,251 B2* | 8/2011 | Chung | A47L 9/009 15/319 |
| 8,508,329 B2* | 8/2013 | Veenstra | G05D 1/0227 180/168 |
| 9,186,800 B2* | 11/2015 | Shin | B25J 19/0091 |
| 2004/0143930 A1* | 7/2004 | Haegermarck | A47L 9/009 15/358 |
| 2014/0138964 A1 | 5/2014 | Shin et al. | |

\* cited by examiner

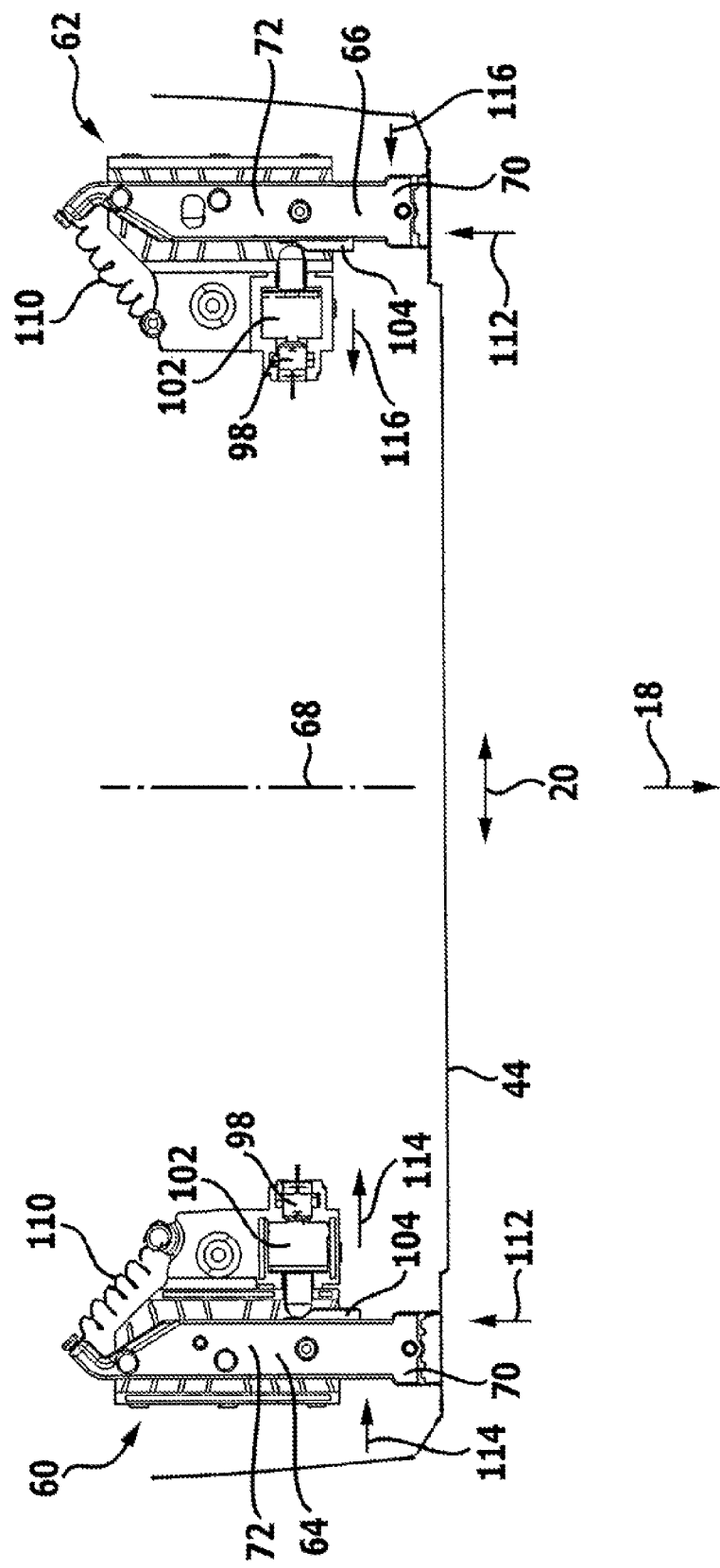

SELF-PROPELLED AND SELF-STEERING FLOOR CLEANING APPLIANCE

CROSS-REFERENCE TO RELATED APPLICATIONS

This application is a continuation patent application of international application number PCT/EP2013/060682 filed on May 23, 2013, which is incorporated herein by reference in its entirety and for all purposes.

FIELD OF THE INVENTION

The present invention relates to a self-propelled and self-steering floor cleaning appliance with at least one cleaning element for cleaning a floor surface, comprising a drive device having an undercarriage, a sensing part for sensing obstacles, at least one displaceable holding part for holding the sensing part on the floor cleaning appliance and at least one detection element for detecting a displacement of the at least one holding part and for providing a signal relating thereto.

BACKGROUND OF THE INVENTION

With a floor cleaning appliance of the aforementioned kind it is possible to autonomously clean a floor surface, for example, by sweeping and/or by vacuuming. For sensing obstacles at or on the floor surface, the floor cleaning appliance comprises the sensing part, which is connected to the displaceable holding part and is held on the floor cleaning appliance by means of the holding part. For example, the holding part, as well as the undercarriage, is held on a chassis of the floor cleaning appliance. When the sensing part contacts an obstacle, the holding part can be displaced and the detection element actuated. A signal relating thereto is provided for acting on the drive device, for example, is transmitted to a control device of the floor cleaning appliance, which, in turn, is in operative connection with the drive device. When the floor cleaning appliance senses an obstacle, the state of movement of the floor cleaning appliance can be changed, for example, the floor cleaning appliance can be stopped, or a change in the direction of travel takes place.

EP 0 274 310 B1 describes a floor cleaning appliance. Upon sensing an obstacle head-on, the holding part of the floor cleaning appliance is displaced and actuates a detection element, whereupon the floor cleaning appliance is stopped. In the event of an off-center collision with an obstacle at the side, the holding part is rotated about an axis of rotation aligned perpendicularly to the direction of displacement. The detection element can be actuated by additional displacement of the holding part. Particularly since the holding part has a considerable size and, therefore, a high inertia, it may happen that the rotation is not followed by displacement of the holding part, and the floor cleaning appliance maintains its direction of travel in spite of the collision with an obstacle, which may result in damage to the floor cleaning appliance.

A floor cleaning appliance with a rotatable and displaceable sensing part is also described in WO 02/071175 A1.

DE 24 48 156 describes a further floor cleaning appliance with a pivotable sensing part.

An object underlying the present invention is to provide a generic floor cleaning appliance, with which collisions with obstacles can be detected more reliably.

SUMMARY OF THE INVENTION

In an aspect of the invention, a self-propelled and self-steering floor cleaning appliance has at least one cleaning element for cleaning a floor surface. The floor cleaning appliance comprises a drive device having an undercarriage, a sensing part for sensing obstacles, at least one displaceable holding part for holding the sensing part on the floor cleaning appliance and at least one detection element for detecting a displacement of the at least one holding part and for providing a signal relating thereto. The floor cleaning appliance comprises at least one accommodating part on which the at least one holding part is held so as to be displaceable in a first direction of displacement and in a second direction of displacement, which is aligned at an angle to the first direction of displacement. The at least one detection element is actuatable by the at least one holding part upon displacement of the holding part in the first direction of displacement and in the second direction of displacement.

BRIEF DESCRIPTION OF THE DRAWINGS

The foregoing summary and the following description may be better understood in conjunction with the drawing figures, of which:

FIG. 8 shows a representation corresponding to FIG. 5, in which a second accommodating part, a second holding part, a second trigger element and a second switch element as well as the contour of a sensing part of the floor cleaning appliance from FIG. 1 are also shown.

DETAILED DESCRIPTION OF PREFERRED EMBODIMENTS OF THE INVENTION

Figure 1:
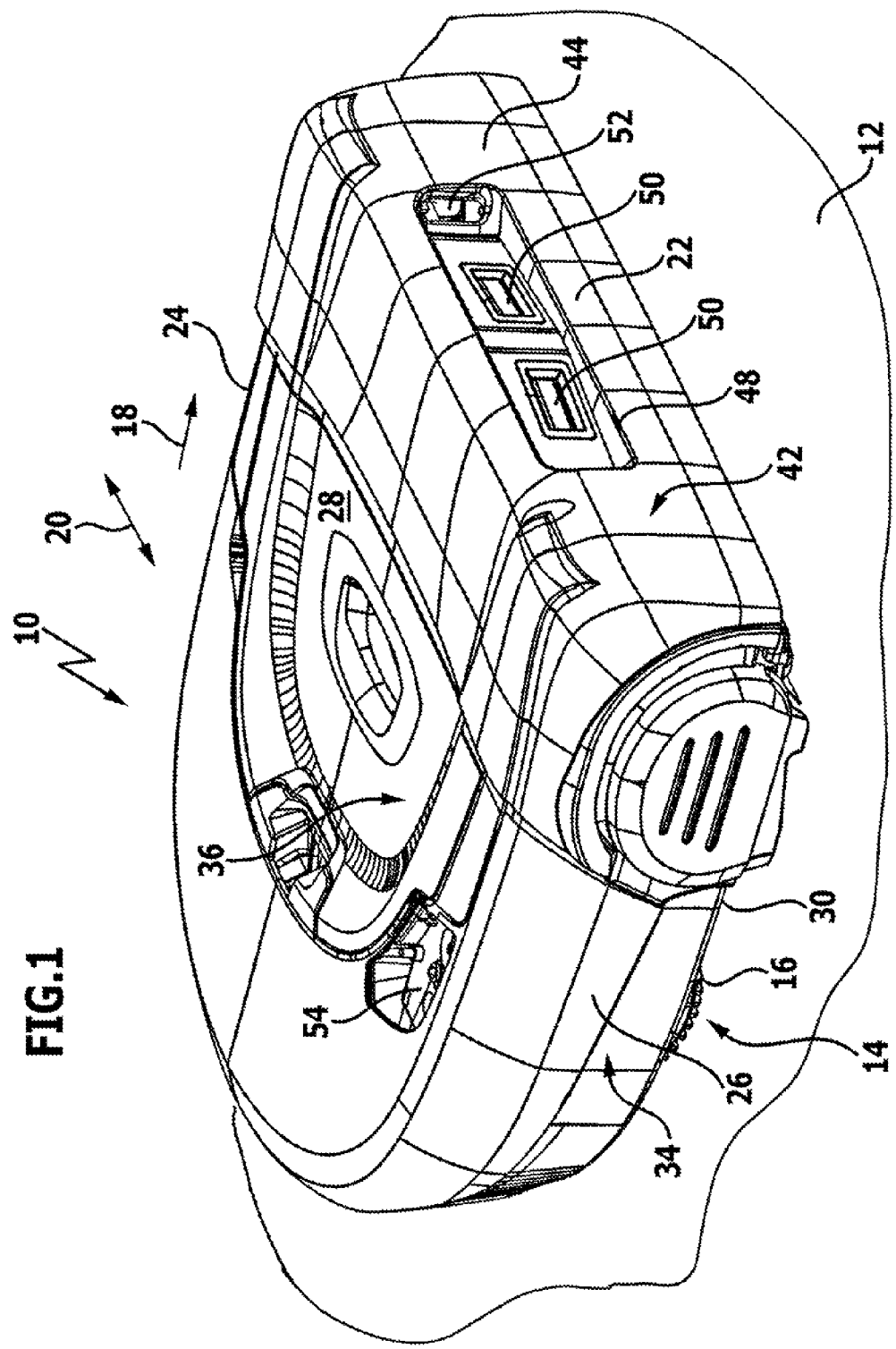
FIG. 1 shows a perspective representation of a floor cleaning appliance in accordance with the invention.
Figure 2:
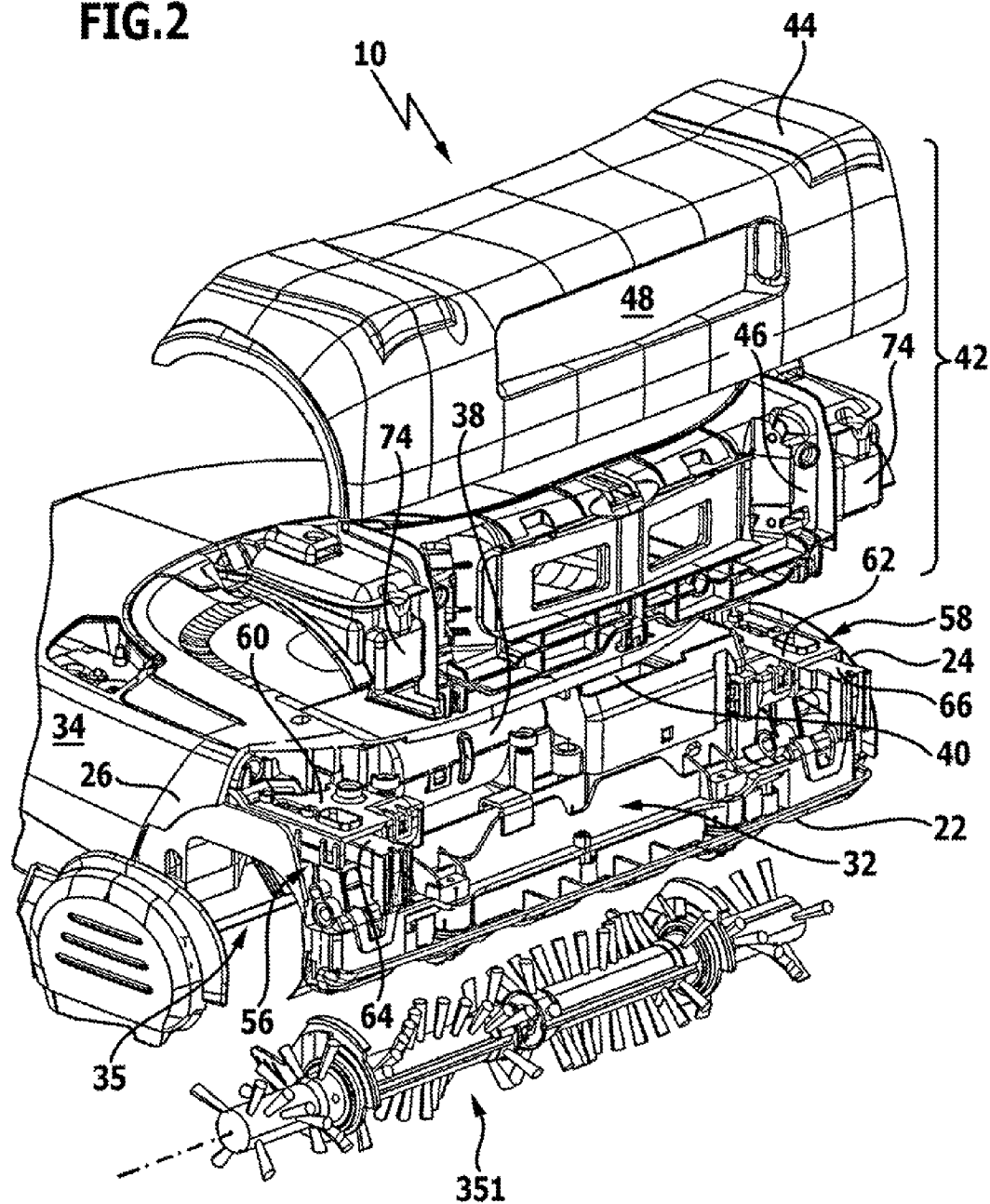
FIG. 2 shows a perspective representation of a front region of the floor cleaning appliance from FIG. 1, partly in exploded representation.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a self-propelled and self-steering floor cleaning appliance with at least one cleaning element for cleaning a floor surface, comprising a drive device having an undercarriage, a sensing part for sensing obstacles, at least one displaceable holding part for holding the sensing part on the floor cleaning appliance and at least one detection element for detecting a displacement of the at least one holding part and for providing a signal relating thereto. The floor cleaning appliance comprises at least one accommodating part on which the at least one holding part is held so as to be displaceable in a first direction of displacement and in a second direction of displacement, which is aligned at an angle to the first direction of displacement. The at least one detection element is actuatable by the at least one holding part upon displacement of the holding part in the first direction of displacement and in the second direction of displacement.

The at least one holding part of the floor cleaning appliance in accordance with the invention is held on the at least one accommodating part so as to be displaceable, more specifically, in two directions of displacement aligned at an angle to each other. This makes it possible to transfer collisions acting on the sensing part along an axis of the first direction of displacement or along an axis of the second direction of displacement to a displacement of the holding part. In particular, it is possible to reliably detect collisions with obstacles at different sides of the floor cleaning appliance, in accordance with the location of the first and the second direction of displacement, as the at least one detection element is actuatable by the holding part upon displacement in the first and in the second direction of displacement. Collisions with obstacles, which act on the sensing part at an angle to the first and the second direction of displacement, can also be detected. This can result in a displacement of the holding part in a direction of displacement resulting from superimposition of the first and the second direction of displacement, which can also be detectable by means of actuation of the at least one detection element.

The displacement of the at least one holding part in the first and the second direction of displacement preferably occurs parallel to a contact plane of the floor cleaning appliance with the floor surface, and, in particular, horizontally.

Position and orientation details such as, for example, "at the front", "at the top", "at the bottom", "horizontally" or the like are, in this context, to be understood as relating to an operating position of the floor cleaning appliance, in which the floor cleaning appliance is positioned on a floor surface to be regarded as horizontally aligned, and, furthermore, to be understood as relating to a longitudinal direction or a main direction of movement of the floor cleaning appliance. During movement in the main direction of movement, the floor cleaning appliance travels straight ahead.

The possibility of displacing the at least one holding part along two directions of displacement aligned at an angle to each other enables, in particular, the holding part and, therefore, the sensing part to be floatingly mounted on the floor cleaning appliance. The floating mounting is preferably in a horizontal plane.

In an advantageous embodiment of the floor cleaning appliance in accordance with the invention, the first direction of displacement and the second direction of displacement are aligned transversely to each other.

It is expedient for the first direction of displacement to be directed opposite to a main direction of movement of the floor cleaning appliance and/or for the second direction of displacement to be aligned transversely to the main direction of movement. The first direction of displacement can be aligned in the longitudinal direction from the front to the rear of the floor cleaning appliance and the second direction of displacement in the transverse direction of the floor cleaning appliance, preferably from the outer side of the floor cleaning appliance in the direction towards a median longitudinal plane of the floor cleaning appliance.

It proves advantageous for the at least one holding part to be displaceable on the at least one accommodating part in the direction opposite to the second direction of displacement. In particular, the holding part can be displaced in the transverse direction of the floor cleaning appliance, viewed from the median longitudinal plane thereof, to an outer side. The displacement opposite to the second direction of displacement proves advantageous if, as will be discussed hereinbelow, the sensing part is preferably held by means of two holding parts and two accommodating parts on the floor cleaning appliance, with the second directions of displacement of the two holding parts being directed opposite to each other. When a holding part is displaced in "its" second direction of displacement, i.e., the second direction of displacement associated with it, the second holding part can be displaced opposite to "its" second direction of displacement associated with it. Starting from a basic position, which the holding parts can assume in the absence of a collision with an obstacle, they can be displaced in a respective and opposite to a respective second direction of displacement. This proves advantageous for a floating and non-tilting mounting of the holding parts and, therefore, of the sensing part.

It is expedient for a displacement distance of the at least one holding part on the at least one accommodating part in the second direction of displacement and in the direction opposite to the second direction of displacement to be of the same size or essentially the same size, starting from a basic position in which the at least one holding part is held under the action of at least one spring element. This proves expedient, in particular, when two holding parts and two accommodating parts, as explained above, are used. The one holding part can be displaced opposite to the second direction of displacement associated with it to the extent to which the other holding part is displaced in the second direction of displacement associated with it.

It is advantageous for the floor cleaning appliance to comprise two holding parts connected to the sensing part, and two accommodating parts, each associated with one respective holding part. The first directions of displacement of the holding parts are preferably aligned parallel to each other and/or the second directions of displacement of the holding parts are preferably directed opposite to each other and towards the respective other holding part. Use of two holding parts enables reliable mounting of the sensing part on the floor cleaning appliance. The holding parts and the accommodating parts accommodating the holding parts can be spaced from each other, in particular, in the transverse direction of the floor cleaning appliance. When a collision occurs along the first direction of displacement, both holding parts can be displaced. In the event of a collision along the second direction of displacement, one holding part can be displaced in the second direction of displacement and the respective other holding part in the direction opposite to its second direction of displacement.

The sensing part preferably connects the holding parts rigidly to each other so movement of one holding part also results in movement of the respective other holding part.

A detection element is preferably associated with each holding part. The detection element can be actuated upon displacement of the respective holding part in the first and the second direction of displacement. This makes it possible, in particular, in the event of a collision resulting in displacement of a holding part in its second direction of displacement, for only the detection element associated with this holding part to be actuated. The floor cleaning appliance can thereby determine on which side of the sensing part a collision occurs.

In practice, it proves advantageous for the holding parts and the accommodating parts to be arranged in a front left corner region and a front right corner region of the floor cleaning appliance, in relation to the longitudinal direction or the main direction of movement of the floor cleaning appliance. The detection elements may also be arranged in the front left or right corner region.

For a compact construction of the floor cleaning appliance, it is expedient if a drive motor and/or a battery of the floor cleaning appliance is/are arranged between the holding parts and the accommodating parts, for example, in the transverse direction of the floor cleaning appliance. The drive motor may be a drive motor for a cleaning element such as a cleaning brush or a drive motor for the undercarriage.

An accommodating space having arranged therein a cleaning element, in particular, a cleaning brush, is preferably formed below the holding parts and the accommodating parts on the floor cleaning appliance. A compact construction of the floor cleaning appliance can thereby also be achieved. Owing to the arrangement of the accommodating parts and holding parts above the accommodating space, accommodating parts and holding parts alongside the cleaning brush can be dispensed with. This allows the cleaning brush to be of such length that it extends over the entire width or almost the entire width of the floor cleaning appliance. This enables cleaning close to the edge or close to the wall to be performed with the floor cleaning appliance.

The sensing part is arranged, in particular, at a front side of the floor cleaning appliance. For example, the sensing part extends in the transverse direction of the floor cleaning appliance over the entire front side thereof.

It is advantageous for the floor cleaning appliance to comprise a housing, and for the sensing part to form a housing section arranged, in relation to a longitudinal direction or a main direction of movement of the floor cleaning appliance, at the front side of the floor cleaning appliance.

Furthermore, it may be provided that the housing section extends along the entire front side of the floor cleaning appliance and/or forms a housing section at the top side of the floor cleaning appliance and/or housing sections at sides of the floor cleaning appliance. In particular, this may be understood as meaning that the housing section formed by the sensing part is partly arranged at the top side of the floor cleaning appliance, for example, near the front side or near left and right sides of the floor cleaning appliance. The housing section may also form part of the housing at the left and/or right side of the floor cleaning appliance. This makes it possible to detect collisions head-on, at an angle from the front and/or from the side.

The at least one holding part may be integrally connected to the sensing part. A connection by means of force and/or positive engagement, for example, clamping or locking, is also conceivable. A screw connection or an adhesive connection is also conceivable.

In an advantageous embodiment, it is expedient for the sensing part to comprise a lower part and an upper part covering the lower part, the lower part being connected to the at least one holding part and to the upper part, and the upper part contacting the obstacles, and electric contact elements for supplying electrical energy to the floor cleaning appliance and/or sensor elements for detecting obstacles in a non-contacting manner being arranged on the lower part.

In this embodiment, "lower part" and "upper part" relate to the fact that the upper part may be indirectly connected to the at least one holding part by way of the lower part. Obstacles can be contacted by means of the upper part and lead by way of the lower part to a displacement of the holding part. The contact elements and/or sensor elements, for example, an optical sensor or an ultrasonic sensor, can be arranged on the lower part. It may be provided that the upper part comprises a through-opening or through-hole through which the sensor elements can transmit and receive signals and the electric contact elements can be reached.

The at least one detection element may preferably comprise or form a switch element, and the at least one holding part may contact the detection element for actuation thereof or contact a trigger element contacting the detection element in order to actuate the detection element. The switch element can thereby be actuated directly by the holding part or indirectly through the interconnection of the trigger element.

The switch element can be, in particular, a microswitch. The trigger element is, for example, a switch plunger, which is displaced by a displacement of the at least one holding part and acts on the switch element. The trigger element is displaced in the second direction of displacement, for example, and a displacement in the first direction of displacement or at a slant thereto is also conceivable.

It is advantageous for the at least one holding part to comprise a contact member for contacting the switch element or the trigger element. The contact member preferably has a bevel relative to the first direction of displacement and relative to the second direction of displacement. It may, for example, be provided that the holding part can be displaced along the first direction of displacement, and the trigger element can be displaced by way of the bevel at an angle thereto, in particular, in the second direction of displacement, in order to actuate the switch element. If, on the other hand, the holding part is displaced in the second direction of displacement, this can also lead to displacement of the trigger element in the second direction of displacement.

In a different advantageous embodiment, the at least one detection element is a sensor element, in particular, a magnetically acting sensor element which is adapted to provide an electric signal upon displacement of the at least one holding part. For example, the sensor element is a Hall sensor, with which a signal can be provided in dependence upon the relative position or relative movement of the holding part and sensor element.

In a constructionally simple configuration, it is expedient for the at least one accommodating part to comprise or form a receptacle for the at least one detection element and/or a trigger element contacting the detection element, the detection element and/or the trigger element being arranged in the receptacle. The receptacle is, for example, concave, and the accommodating part may be shell-shaped.

For the floor cleaning appliance to function reliably, it is expedient if the at least one accommodating part defines a guide for the at least one holding part during displacement along the first direction of displacement and along the second direction of displacement.

It proves advantageous for a shaft-shaped accommodating space, in which the at least one holding part engages and is displaceable in the first direction of displacement or the second direction of displacement, and in which the at least one holding part is displaceable in the respective other direction of displacement, to be formed on the at least one accommodating part, with at least one wall of the accommodating space forming a guide for the at least one holding part. The shaft-shaped accommodating space is formed, in particular, in the at least one accommodating part. The holding part can move in the accommodating space in a plane spanned by the first and the second direction of displacement. A wall of the accommodating space, which is arranged in a direction transverse to the first and to the second direction of displacement, can define the guide, and the holding part can lie against the wall for guidance.

It is expedient for the at least one holding part to be arranged free of play or substantially free of play transversely to the first and the second direction of displacement in the accommodating space between walls delimiting the accommodating space. The walls can thereby guide the holding part at opposite sides. This proves advantageous, in particular, for floatingly mounting the holding part on the accommodating part. No or no substantial movement of the holding part can occur along the direction aligned transversely to the first and to the second direction of displacement.

For a constructionally simple configuration, it is advantageous if the at least one accommodating part comprises a lower part forming a support for the at least one holding part, and an upper part placed on the lower part and covering the at least one holding part. The lower part forms, for example, the aforementioned receptacle for the detection element and/or the trigger element. The upper part may be connected to the lower part, for example, by clamping or locking. The holding part, resting on the lower part, is arranged between the upper part and the lower part, for example, in the aforementioned accommodating space.

In practice, it proves expedient for the lower part and the upper part to be half-shells.

It also proves expedient for the at least one detection element to be actuatable after a displacement of approximately 1 mm to 2 mm of the at least one holding part along one of the two directions of displacement. A minimum distance of displacement of the holding part is necessary for actuating the detection element. For example, the detection element can thereby be prevented from already being actuated when the sensing part only grazes an obstacle or comes into contact with an obstacle which is not stiff such as, for example, curtains or net curtains. The floor cleaning appliance can pass such obstacles without changing its running state.

It is advantageous for the at least one holding part, upon actuation of the at least one detection element, to be further displaceable in the first direction of displacement and/or in the second direction of displacement by an additional displacement distance. This allows the sensing part to continue to move somewhat relative to the floor cleaning appliance after actuation of the detection element. If the signal of the detection element results in a drive for the undercarriage being switched off, the floor cleaning appliance can brake during the additional movement of the sensing part. In practice, it is found that errors of wheel encoders detecting the revolutions of wheels (of the undercarriage) can thereby be reduced.

The additional displacement distance along the first direction of displacement may, for example, be approximately 5 mm to 10 mm, and along the second direction of displacement approximately 2 mm to 4 mm. In particular, the additional displacement distance is greater than the minimum adjustment distance which the holding part must cover in order to actuate the detection element.

The floor cleaning appliance advantageously comprises stops for delimiting the movement of the at least one holding part relative to the at least one accommodating part. Preferably, the at least one holding part and the at least one accommodating part may comprise or form the stops.

In a constructionally simple embodiment, it is expedient for the at least one holding part to comprise at least one peg-shaped projection which engages in at least one recess on the at least one accommodating part, with the edges of the recess forming stops for the projection. The recess on the accommodating part may form a boundary, within which the projection may move. When the projection strikes an edge of the boundary, the movement of the holding part relative to the accommodating part is thereby delimited. In an advantageous embodiment, the recess is a through-hole, for example, a window-shaped through-hole in the accommodating part, and it may have a rectangular shape. It may be provided that the holding part has projections at opposite sides, which each engage a respective recess on the accommodating part. The recesses may, for example, be arranged on a lower part and an upper part of the accommodating part.

It is advantageous for the displacement of the at least one holding part to occur against the restoring force of at least one spring element. This allows the holding part and, therefore, the sensing part to assume a basic position in the absence of contact with an obstacle.

The at least one spring element is preferably arranged and active in the plane of the first direction of displacement and the second direction of displacement, in order to ensure reliable functioning.

In an advantageous embodiment, a spring element engages the at least one holding part and the at least one accommodating part. The spring element preferably acts on the at least one holding part with a force directed at a slant to the first direction of displacement and at a slant to the second direction of displacement. A force can thereby be directed at the holding part along the first and along the second direction of displacement. In particular, a force is exerted on the holding part in the direction opposite to the first direction of displacement.

The force of at least one spring element preferably has a component in the second direction of displacement of the at least one holding part. This is preferably the spring element of the last aforementioned advantageous embodiment. The component in the second direction of displacement of the holding part may serve, when two holding parts are present, to displace the respective other holding part in the direction opposite to its second direction of displacement. The force component, therefore, preferably faces in the direction opposite to the second direction of displacement of the respective other holding part.

The spring elements of the two aforementioned advantageous embodiments are, for example, tension springs and configured, in particular, as helical springs.

It is expedient for a spring element which acts on the at least one holding part or on a trigger element with a restoring force directed opposite to the second direction of displacement to be arranged on the at least one detection element. The spring element, in particular, a pressure spring and preferably configured as a helical spring, can displace the holding part or the trigger element in the direction opposite to its second direction of displacement. The spring element is arranged, for example, in the same receptacle as the trigger element on which it can act.

FIG. 1 shows in perspective representation an advantageous embodiment, designated in its entirety by reference numeral 10, of a floor cleaning appliance in accordance with the invention. The floor cleaning appliance 10 is of self-propelled and self-steering construction and allows autonomous cleaning of a floor surface 12. For movement on the floor surface 12, the floor cleaning appliance 10 comprises a drive device 14 with an undercarriage 16 and a drive motor (not shown) driving the undercarriage. The floor cleaning appliance 10 is normally moved straight ahead along a main direction of movement 18, which corresponds to a longitudinal direction of the floor cleaning appliance 10. Transversely to the longitudinal direction 18, the floor cleaning appliance 10 has a transverse direction 20.

Position and orientation details relate, in this context, to an operating position of the floor cleaning appliance 10, in which the floor cleaning appliance is to be seen as positioned on the floor surface 12 regarded as being horizontal. A front side 22, a left side 24, a right side 26, a top side 28 and a bottom side 30 of the floor cleaning appliance 10 are also defined by way of the longitudinal or main direction of movement 18.

The undercarriage 16 is held on a chassis 32 of the floor cleaning appliance 10 on the bottom side 30, with the chassis 32 forming part of a housing 34 of the floor cleaning appliance 10. On the bottom side 30, near the front side 22, the chassis 32 forms an accommodating space 35 for a cleaning element, in this case, in the form of a cleaning brush 351. The cleaning brush 351 is rotatingly drivable about an axis of rotation extending in the transverse direction 20 in order to sweep dirt from the floor surface 12. A further cleaning element is provided in the form of a suction unit (not shown) in order to draw the dirt by suction into a dirt collection container 36. A drive motor 38 for the cleaning brush 351 is held on the chassis 32, above the accommodating space 35. Arranged alongside the drive motor 38 on the chassis 32 in a battery receptacle is at least one rechargeable battery 40 for supplying electrical energy to the drive motor 38 and/or the drive device 14.

The housing 34 has a housing section which serves to sense obstacles on or at the floor surface 12 and is therefore designated sensing part 42. The sensing part 42 extends in the transverse direction 20 at the front side 22 over the entire width of the floor cleaning appliance 10 and from the bottom side 30 to the top side 28. The sensing part 42 also forms a section of the housing 34 at the top side 28, approximately over a fourth of the length of the floor cleaning appliance 10. In addition, the sensing part 42 forms sections of the housing 34 at the sides 24 and 26 of approximately the same length. These housing sections pass over into the housing sections at the top side 28 and the front side 22, which are also formed by the sensing part 42.

The sensing part 42 comprises an upper part 44 facing away from the chassis 32 and forming the aforementioned sections of the housing 34, and a lower part 46 facing the chassis 32 and connected to the upper part 44, for example, by locking and/or clamping. The contour of the upper part 44 at the front side 22 and the sides 24, 26 is shown schematically in FIG. 8.

The upper part 44 has an opening 48 at the front side 22. Electric contact elements arranged on the lower part 46 can be accessed through the opening 48 in order that the battery 40 can be charged. Non-contacting sensor elements 52 (only one shown) may also be held on the lower part 46. By means of the sensor elements 52, obstacles can be detected without contact and the environment of the floor cleaning appliance 10 explored and a signal relating to this sent to a control device 54.

For mounting the sensing part 42 on the chassis 32, the floor cleaning appliance has in a front right corner region 56 and a front left corner region 58 accommodating parts 60, 62 and holding parts 64, 66 interacting with these. The accommodating parts 60, 62 are arranged above the accommodating space 35 for the cleaning brush 351 on the chassis 32, and the drive motor 38 and the battery 40 are positioned between these in the transverse direction 20.

Mounting the sensing part 42 on the chassis 32 above the accommodating space 35 and the cleaning brush 351 eliminates the necessity for mountings alongside the cleaning brush 351. Consequently, the cleaning brush can be of such length that it extends in the transverse direction 20 over almost the entire width of the floor cleaning appliance 10.

The accommodating part 60 and the holding part 64, on the one hand, and the accommodating part 62 and the holding part 66, on the other hand, are of substantially symmetrical configuration relative to each other in relation to a median longitudinal plane 68 of the floor cleaning appliance 10 (FIG. 8). With respect to their functioning, the accommodating part 60 and the holding part 64, on the one hand, and the accommodating part 62 and the holding part 66, on the other hand, are substantially identical, but differences do result from the arrangement on the right and the left, respectively, of the median longitudinal plane 68. It is therefore mainly the accommodating part 60 and the holding part 64 that are dealt with in detail hereinbelow. If there are differences in structure and function for the accommodating part 62 and the holding part 66, these will be explained. The same reference numerals are used for features of the accommodating parts 60, 62 and the holding parts 64, 66, which are the same and have the same effect.

The holding part 64, in this case, is of beam-shaped or bar-shaped construction and has an approximately L-shaped configuration with respect to a vertical sectional plane. It has a holding section 70 at the front side 22 and a bearing section 72 in the longitudinal direction behind it. The holding section 70 can engage a recess 74 on the sensing part 42, specifically on the lower part 46. The holding section 70 is fixed in the recess 74, in this case, by screw connection. The holding sections 70 are fixedly and, in particular, rigidly connected to each other by way of the sensing part 42. In the event of a collision with an obstacle, which results in movement of the sensing part 42, the two holding parts 64 and 66 can therefore move.

Figure 3:
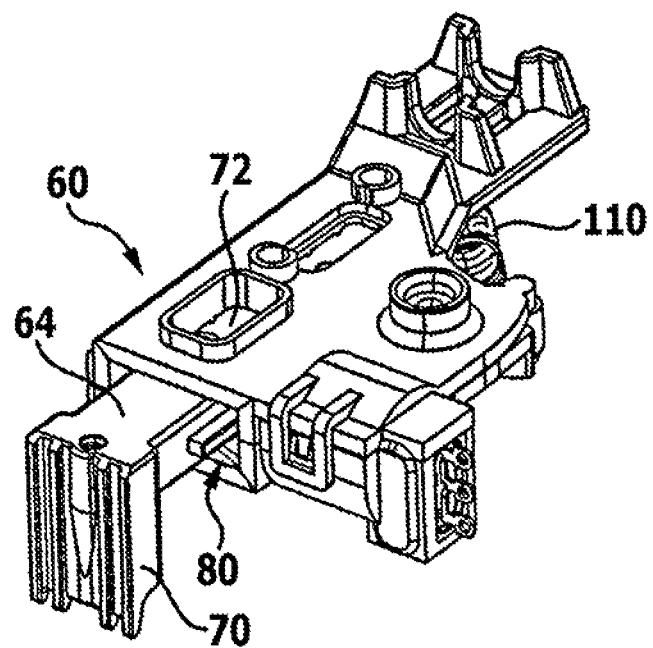
FIG. 3 shows a perspective representation of an accommodating part and a holding part, displaceably held on the accommodating part, of the floor cleaning appliance from FIG. 1, in which a detection element and a trigger element are also arranged in the accommodating part.
Figure 4:
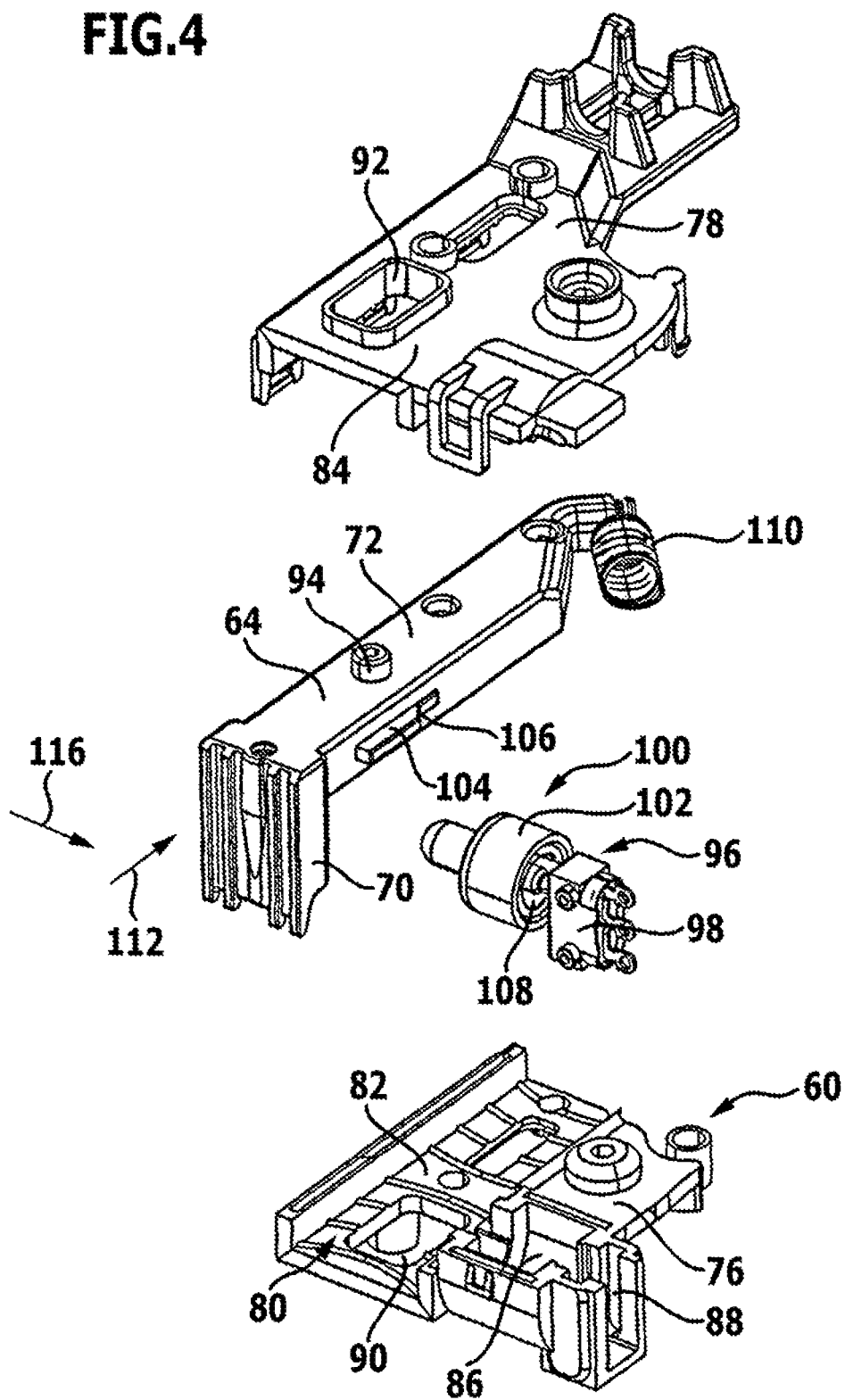
FIG. 4 shows an exploded representation in accordance with FIG. 3.

The accommodating part 60 is attached to the chassis 32, for example, by force locking and/or positively locking connection, in this case, by screw connection. As shown, in particular, in FIGS. 3 and 4, the accommodating part 60 has a lower part 76, in this case, dish-shaped, and an upper part 78 placed on the lower part 76. The lower part 76 and the upper part 78 are connected to each other, for example, by locking and are configured as half-shells. Formed between the lower part 76 and the upper part 78 is a shaft-shaped accommodating space 80, which is delimited on the bottom side by a wall 82 of the lower part 76 and on the top side by a wall 84 of the upper part 78. Formed alongside the accommodating space 80, in the direction of the median longitudinal plane 68, in the lower part 76 is a receptacle 86 and adjacent thereto a further receptacle 88.

The walls 82 and 84 have recesses in the form of through-holes 90 and 92, respectively. In a plan view of the accommodating part 60, the through-holes 90, 92 have a rectangular contour with rounded corners and are enclosed by edges on the walls 82, 84.

The holding part 64 engages with the bearing section 72 along the longitudinal direction 18 in the accommodating space 80 and protrudes in the longitudinal direction 18 at the front and back beyond the accommodating space 80. The wall 82 forms a support for the bearing section 72, and the wall 84 covers the bearing section 72. Transversely to the longitudinal direction 18 and transversely to the transverse direction 20, the holding part 64 is therefore arranged with the bearing section 72 substantially free of play in the accommodating space 80. The accommodating part 60 thereby forms a guide for the holding part 64, which, as will be explained hereinbelow, can be displaced relative to the accommodating part 60.

In this case, the support for the holding part 64 is aligned parallel to a contact plane of the floor cleaning appliance 10 for the floor surface 12 and therefore aligned horizontally in the case of a horizontal floor surface 12.

Facing the lower part 76 and the upper part 78, the bearing part has projections, of which only one projection 94 facing the upper part 78 is shown. The projection 94 is peg-shaped and engages the through-hole 92. The same applies accordingly to the projection that is not shown and the through-hole 90. The through-holes 90, 92 and the projections 94 form interacting stops for delimiting the movement of the holding part 64 relative to the accommodating part 60. The through-holes 90, 92 can, as it were, be regarded as boundary, within which the projections 94 can be moved when the holding part 64 is displaced relative to the accommodating part 60.

Arranged in the receptacle 88 is a detection element 96, in this case, configured as a switch element, in particular, as microswitch 98. The microswitch 98 has a switching distance of approximately one millimeter to two millimeters. Arranged between the bearing section 72 and the microswitch 98 in the receptacle 86 is a trigger element 100, in this case, configured as switch plunger 102. The switch plunger 102 contacts the microswitch 98 and can be contacted by the bearing section 72. For this purpose, a contact member 104 is arranged on the bearing section 72 on the side thereof facing the switch plunger 102. The contact member 104 has a bevel 106 which is aligned at a slant to the longitudinal direction 18 and the transverse direction 20.

The switch plunger 102 is pretensioned by a spring element 108 in the direction towards the holding part 64. The spring element 108, in this case, a helical spring, is supported on the lower part 76 and the switch plunger 102.

The microswitch 98 is electrically connected to the control device 54. When the floor cleaning appliance 10 contacts an obstacle by way of the sensing part 42, its movement and the associated movement of the holding part 64 can cause actuation of the microswitch 98. A signal relating to this can be sent to the control device 54. Thereupon the drive device 14 can be activated to change the state of movement of the floor cleaning appliance 10, in particular, to stop it or to bring about a change in the direction of travel.

A further spring element 110 (FIGS. 3, 4 and 8) engages the holding part 64 and the accommodating part 60. The spring element 110 engages the bearing section 72 at its rear end protruding beyond the accommodating space 80 and the lower part 76 at its rear edge. The spring element 110 is, in this case, a helical spring and, in particular, a tension spring. The spring element 110 is aligned at a slant to the longitudinal direction 18 and the transverse direction 20. The spring element 110 can thereby act on the holding part 64 with a force component directed forwards and a force component directed in the direction towards the median longitudinal plane 68. The force component in the direction of the median longitudinal plane 68 is also directed towards the holding part 66 and runs in the transverse direction 20.

The holding part 64 is of such dimensions that it is narrower in the transverse direction 20 than the width of the accommodating space 80. The holding part 64 can thereby be displaced along the transverse direction 20 relative to the accommodating part 60 (see below).

In a basic position of the holding part 64 relative to the accommodating space 80, in which basic position no displacement force acts on the holding part 64 by way of the sensing part 42, the projections 94 strike edges of the through-holes 90, 92 in the direction of the front side 22. The projections 94 are arranged midway between side edges of the through-holes 90, 92 (FIG. 5, in which the contour of the through-hole 92 is indicated by dashed lines). The holding part 64 assumes the basic position under the action of the spring elements 108 and 110, owing to the rigid coupling of the holding parts 64 and 66 and also under the action of the spring elements 108, 110 on the other holding part 66 and the other accommodating part 62. In the basic position of the holding part 64, the switch plunger 102 contacts the bearing section 72 at the bevel 106.

Figure 5:
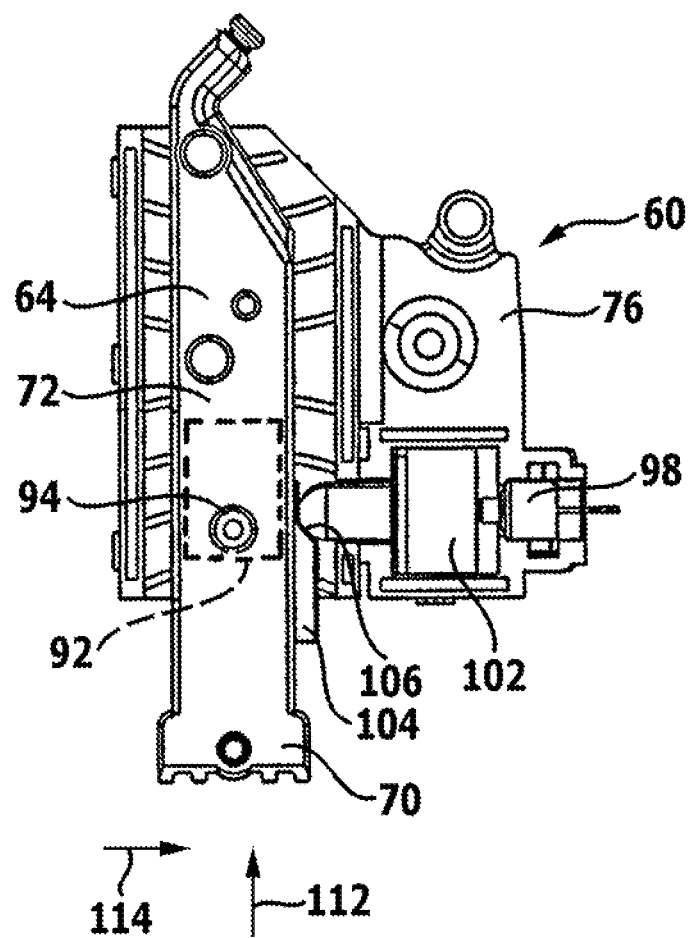
FIG. 5 shows a plan view of the components in accordance with FIG. 3, in which an upper part of the accommodating part is not shown and the holding part assumes a basic position.
Figure 6:
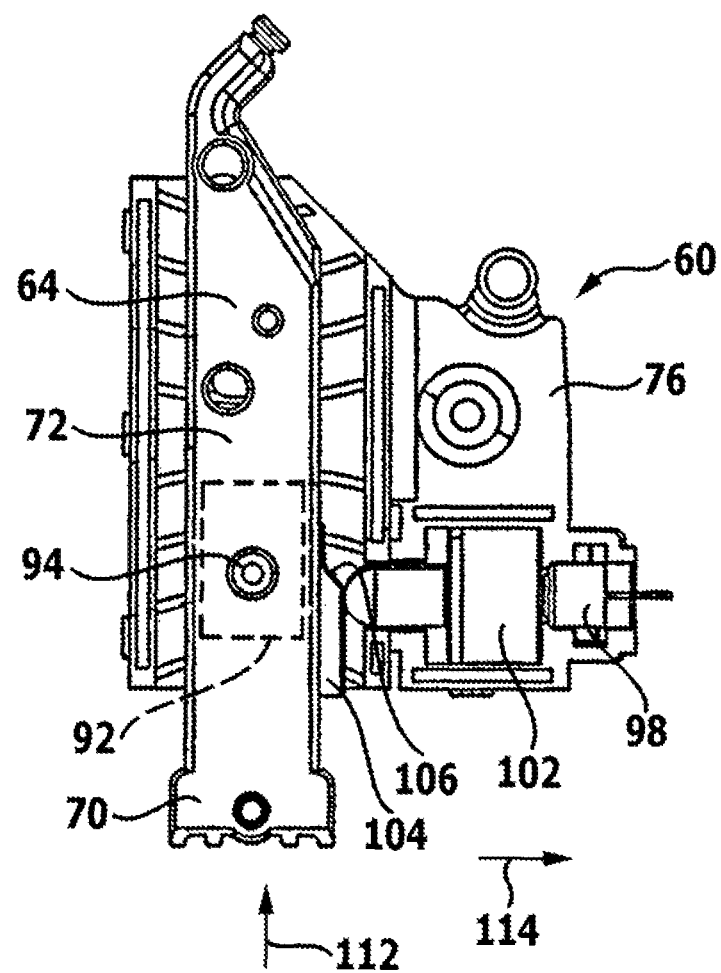
FIG. 6 shows a view corresponding to FIG. 5 after the holding part has been displaced in a first direction of displacement.

The holding part 64 is displaceable relative to the accommodating part 60 in a first direction of displacement 112 and is thereby guided by the accommodating part 60 (FIGS. 5 and 6). The first direction of displacement 112 is opposite to the main direction of movement 18 (straight ahead movement). When the holding part 64 is displaced, the bevel 106 slides along the switch plunger 102. Owing to the bevel 106, the switch plunger 102 is displaced in a second direction of displacement 114. The second direction of displacement 114 is aligned transversely to the first direction of displacement 112 and runs in the transverse direction 20, more specifically, in the direction towards the median longitudinal plane 68.

The displacement of the switch plunger 102 results in actuation of the microswitch 98. In the event of a head-on collision of the floor cleaning appliance 10 with an obstacle, resulting in displacement of the holding part 64 in the first direction of displacement 112, the running state of the floor cleaning appliance 10 can thereby, as explained hereinabove, be changed. The microswitch 98 only responds if the holding part 64 has been displaced approximately two millimeters along the first direction of displacement 112. This prevents the running state of the floor cleaning appliance 10 from being changed when the sensing part 42 touches an obstacle only lightly, for example, grazes it.

When the microswitch 98 is actuated, the holding part 64 is displaceable further relative to the accommodating part 60 until the projections 94 strike the rear edges of the through-holes 90, 92. The additional displacement distance in the first direction of displacement 112 is approximately five to ten millimeters. When the microswitch 98 is actuated as a result of a collision, the floor cleaning appliance 10 is thereby given time to brake, for example, approximately 30 milliseconds to 50 milliseconds. This prevents wheels of the undercarriage 16 from spinning and the data of wheel encoders detecting the number of revolutions of the wheels from being erroneous.

In a corresponding manner, the holding part 66 is displaceable relative to the accommodating part 62 along the first direction of displacement 112 opposite to the main direction of movement 18 (straight ahead travel) and is guided by the accommodating part 62. Under the action of the spring elements 110, the holding parts 64, 66 can be moved into the basic position again. The tension force of both spring elements 110 acts on both holding parts, more specifically, the tension force of the spring element 110 respectively arranged on them acts directly and owing to the rigid coupling by way of the sensing part 42 the force of the spring element 110 at the respective other accommodating part 60, 62 acts indirectly.

Figure 7:
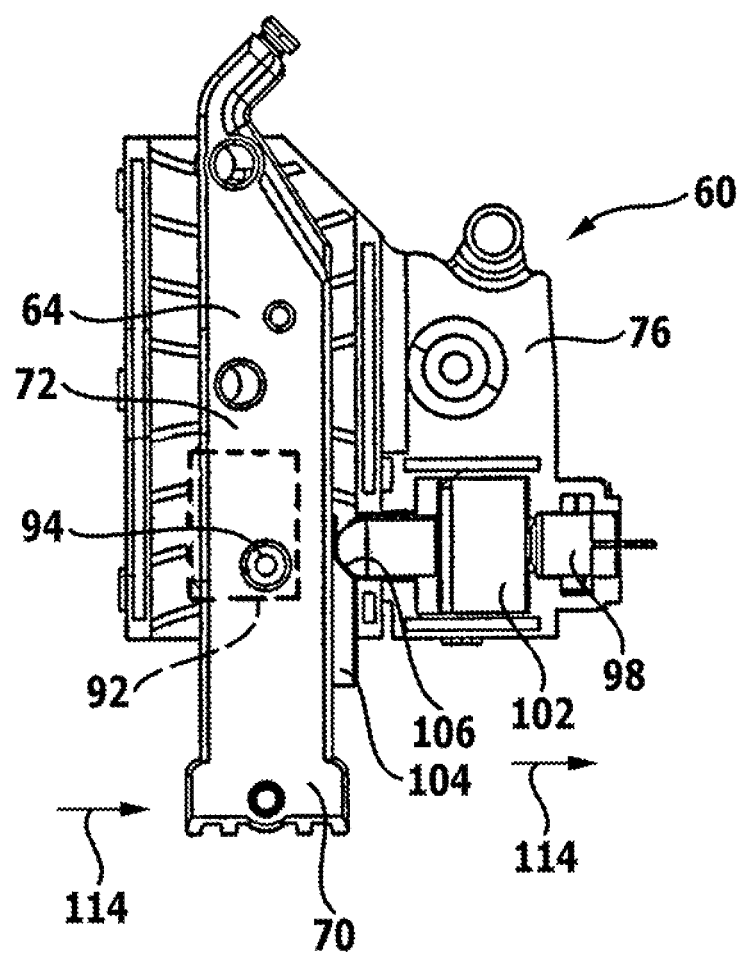
FIG. 7 shows a representation corresponding to FIG. 5, in which the holding part has been displaced in a second direction of displacement.

The holding part 64 can also be displaced relative to the accommodating part 60 in the second direction of displacement 114, in the direction towards the median longitudinal plane 68 (FIGS. 5 and 7). A force in the second direction of displacement 114 on the sensing part 42, exerted, for example, by collision with an obstacle on the right side 26, displaces the holding part 64 in the accommodating space 80 and, consequently, also the switch plunger 102 in the second direction of displacement 114. The adjustment distance until actuation of the microswitch 98 is approximately one millimeter to two millimeters. After actuation, the holding part 64 is displaceable approximately a further two to three millimeters until the projections 94 strike the side edges of the through-holes 90, 92. The floor cleaning appliance 10 is thereby also given time, approximately ten to twenty milliseconds, to brake.

The holding part 66 and the switch plunger 102 associated with it on the accommodating part 62 are, for their part, displaceable along a second direction of displacement 116 on the accommodating part 62. The direction of displacement 116 also runs in the transverse direction 20 and opposite to the direction of displacement 114. It therefore faces in the direction towards the median longitudinal plane 68 and towards the other holding part 64. A collision of the sensing part 42 with an obstacle, for example, on the left side 24 can thereby displace the holding part 66 and the switch plunger 102 in the second direction of displacement 116 and actuate the microswitch 98 on the second accommodating part.

The holding parts 64, 66 can be moved into the basic position again under the action of the spring elements 108, 110. This occurs under the action of the pressure of the spring element 108 on the accommodating part 60 or 62 on which the respective holding part 64 or 66 is arranged. This also occurs under the tensile action of the spring element 110 arranged on the respective other holding part 64 or 66 and accommodating part 60 or 62, and under the rigid coupling of the holding parts 64, 66 due to the sensing part 42.

The bearing section 72 is, as mentioned above, narrower than the width of the accommodating space 80 in the transverse direction 20. Therefore, if one of the holding parts 64, 66 is displaced in "its" respective second direction of displacement 114 or 116 associated with it, displacement of the respective other holding part 66 or 64 also occurs owing to the rigid coupling by way of the sensing part 42. The respective other holding part 66 or 64 is displaced opposite to "its" second direction of displacement 116 or 114 associated with it, i.e., the holding part 66 opposite to the direction of displacement 116 and in the direction of displacement 114, and the holding part 64 opposite to the direction of displacement 114 and in the direction of displacement 116.

The displaceability of both holding parts 64, 66 in two directions of displacement aligned transversely to each other makes a floating mounting of the holding parts 64, 66 and, consequently, of the sensing part 42 possible. In the event of a collision of the sensing part 42, the holding parts 64, 66 can be displaced such that at least one of the microswitches 98 can be actuated and obstacles reliably sensed. The displacement occurs in the plane of the mounting of the holding parts 64, 66 and under guidance by the accommodating parts 60, 62. In particular, it is possible to displace the holding parts 64, 66 in directions which result from superimpositions of the direction of displacement 112 and 114 and 112 and 116, respectively. The movement of the sensing part 42 occurs as a result of the floating mounting free from pivoting about a fixed axis of rotation.

In the event of a collision of the floor cleaning appliance with an obstacle located head-on, the sensing part 42 and both holding parts are displaced along the first direction of displacement 112 and both microswitches 98 are actuated. If this occurs at the same time or within a predefined or predefinable time interval, the floor cleaning appliance 10 can thereby detect the presence of an obstacle located head-on or essentially head-on. In the event of a collision from the left side 24 or the right side 26, a displacement occurs only in the transverse direction 20 (in the direction of displacement 116 or 114), and only the microswitch 98 located closest to the respective side 24, 26 is actuated. The floor cleaning appliance 10 can thereby detect the presence of an obstacle at the side.

In the event of inclined collision with an obstacle, displacement of the sensing part 42 and the holding parts 64, 66 occurs in a direction which results from superimposition of the directions of displacement 112 and 114 and 112 and 116, respectively. Both microswitches 98 can thereby be actuated one after the other. The floor cleaning appliance 10 can determine from the interval of time between the actuations the approximate position at which the obstacle is located. If, for example, the microswitch 98 on the accommodating part 60 is actuated before the microswitch 98 on the accommodating part 62, the obstacle is located on the right of the front side 22 or near the right corner region 56. If the microswitch 98 on the accommodating part 62 is actuated first and then the microswitch 98 on the accommodating part 60, the obstacle is located on the left of the front side 22 or near the left corner region 58.

The invention claimed is:

1. A self-propelled and self-steering floor cleaning appliance with at least one cleaning element for cleaning a floor surface, comprising a drive device having an undercarriage, a sensing part for sensing obstacles, at least one slidingly displaceable holding part for holding the sensing part on the floor cleaning appliance and at least one detection element for detecting a displacement of the at least one holding part and for providing a signal relating thereto, wherein the floor cleaning appliance comprises at least one accommodating part on which the at least one holding part is held so as to be slidingly displaceable in a first direction of displacement and in a second direction of displacement, which is aligned at an angle to the first direction of displacement, wherein the at least one detection element is actuatable by the at least one holding part upon displacement of the holding part in the first direction of displacement and in the second direction of displacement.

2. The floor cleaning appliance in accordance with claim 1, wherein the first direction of displacement and the second direction of displacement are aligned transversely to each other.

3. The floor cleaning appliance in accordance with claim 1, wherein the first direction of displacement is directed opposite to a main direction of movement of the floor cleaning appliance and/or wherein the second direction of displacement is aligned transversely to the main direction of movement.

4. The floor cleaning appliance in accordance with claim 1, wherein the at least one holding part is displaceable on the at least one accommodating part in the direction opposite to the second direction of displacement.

5. The floor cleaning appliance in accordance with claim 4, wherein a displacement distance of the at least one holding part on the at least one accommodating part in the second direction of displacement and in the direction opposite to the second direction of displacement is of the same size or essentially the same size, starting from a basic position in which the at least one holding part is held under the action of at least one spring element.

6. The floor cleaning appliance in accordance with claim 1, wherein the floor cleaning appliance comprises two holding parts connected to the sensing part, and two accommodating parts, each associated with one respective holding part, and wherein the first directions of displacement of the holding parts are aligned parallel to each other and/or the second directions of displacement of the holding parts are directed opposite to each other and towards the respective other holding part.

7. The floor cleaning appliance in accordance with claim 6, wherein the sensing part connects the holding parts rigidly to each other.

8. The floor cleaning appliance in accordance with claim 6, wherein the holding parts and the accommodating parts are arranged in a front left corner region and a front right corner region of the floor cleaning appliance, in relation to the longitudinal direction or the main direction of movement of the floor cleaning appliance.

9. The floor cleaning appliance in accordance with claim 6, wherein at least one of a drive motor and a battery of the floor cleaning appliance is arranged between the holding parts and the accommodating parts.

10. The floor cleaning appliance in accordance with claim 6, wherein an accommodating space having arranged therein a cleaning element is formed below the holding parts and the accommodating parts on the floor cleaning appliance.

11. The floor cleaning appliance in accordance with claim 1, wherein the floor cleaning appliance comprises a housing, and the sensing part forms a housing section arranged, in relation to a longitudinal direction or a main direction of movement of the floor cleaning appliance, at the front side of the floor cleaning appliance.

12. The floor cleaning appliance in accordance with claim 11, wherein the housing section extends along the entire front side of the floor cleaning appliance.

13. The floor cleaning appliance in accordance with claim 11, wherein the housing section forms at least one of a housing section at the top side of the floor cleaning appliance and housing sections at left and right sides of the floor cleaning appliance.

14. The floor cleaning appliance in accordance with claim 1, wherein the sensing part comprises a lower part and an upper part covering the lower part, the lower part being connected to the at least one holding part and to the upper part, and the upper part contacting the obstacles, and electric contact elements for supplying electrical energy to the floor cleaning appliance and/or sensor elements for detecting obstacles in a non-contacting manner being arranged on the lower part.

15. The floor cleaning appliance in accordance with claim 1, wherein the at least one detection element comprises or forms a switch element, and wherein the at least one holding part contacts the detection element in order to actuate the detection element or a trigger element contacting the detection element.

16. The floor cleaning appliance in accordance with claim 15, wherein the at least one holding part comprises a contact member with a bevel relative to the first direction of displacement and relative to the second direction of displacement for contacting the switch element or the trigger element.

17. The floor cleaning appliance in accordance with claim 1, wherein the at least one detection element is a magnetically acting sensor element which is adapted to provide an electric signal upon displacement of the at least one holding part.

18. The floor cleaning appliance in accordance with claim 1, wherein the at least one accommodating part comprises or forms a receptacle for at least one of the at least one detection element and a trigger element contacting the detection element.

19. The floor cleaning appliance in accordance with claim 1, wherein the at least one accommodating part defines a guide for the at least one holding part during displacement along the first direction of displacement and along the second direction of displacement.

20. The floor cleaning appliance in accordance with claim 1, wherein a shaft-shaped accommodating space, in which the at least one holding part engages and is displaceable in the first direction of displacement or the second direction of displacement, and in which the at least one holding part is displaceable in the respective other direction of displacement, is formed on the at least one accommodating part, and at least one wall of the accommodating space forms a guide for the at least one holding part.

21. The floor cleaning appliance in accordance with claim 20, wherein the at least one holding part is arranged free of play or substantially free of play transversely to the first and the second direction of displacement in the accommodating space between walls delimiting the accommodating space.

22. The floor cleaning appliance in accordance with claim 1, wherein the at least one accommodating part comprises a lower part forming a support for the at least one holding part, and an upper part placed on the lower part and covering the at least one holding part.

23. The floor cleaning appliance in accordance with claim 22, wherein the lower part and the upper part are half-shells.

24. The floor cleaning appliance in accordance with claim 1, wherein the at least one detection element is actuatable after a displacement of approximately 1 mm to 2 mm of the at least one holding part.

25. The floor cleaning appliance in accordance with claim 1, wherein the at least one holding part, upon actuation of the at least one detection element, is further displaceable in at least one of the first direction of displacement and the second direction of displacement by an additional displacement distance.

26. The floor cleaning appliance in accordance with claim 25, wherein the additional displacement distance along the first direction of displacement is approximately 5 mm to 10 mm, along the second direction of displacement approximately 2 mm to 4 mm.

27. The floor cleaning appliance in accordance with claim 1, wherein the at least one holding part and the at least one accommodating part comprise or form stops for delimiting the movement of the at least one holding part relative to the at least one accommodating part.

28. The floor cleaning appliance in accordance with claim 27, wherein the at least one holding part comprises at least one peg-shaped projection which engages in at least one recess on the at least one accommodating part, with the edges of the recess forming stops for the projection.

29. The floor cleaning appliance in accordance with claim 1, wherein the displacement of the at least one holding part occurs against the restoring force of at least one spring element.

30. The floor cleaning appliance in accordance with claim 29, wherein the at least one spring element is arranged and active in a plane defined by the first direction of displacement and the second direction of displacement.

31. The floor cleaning appliance in accordance with claim 29, wherein a spring element of the at least one spring element engages the at least one holding part and the at least one accommodating part and acts on the at least one holding part with a force directed at a slant to the first direction of displacement and at a slant to the second direction of displacement.

32. The floor cleaning appliance in accordance with claim 29 wherein the force of a spring element of the at least one spring element has a component in the second direction of displacement of the at least one holding part.

33. The floor cleaning appliance in accordance with claim 1, wherein a spring element which acts on the at least one holding part or on a trigger element with a restoring force directed opposite to the second direction of displacement is arranged on the at least one detection element.

\* \* \* \* \*